US012591167B2

(12) United States Patent
Berst et al.

(10) Patent No.: US 12,591,167 B2
(45) Date of Patent: Mar. 31, 2026

(54) ENCLOSURES FOR ACCOMMODATING BOARD STACKS

(71) Applicant: Components Express, LLC, Woodridge, IL (US)

(72) Inventors: John Berst, Woodridge, IL (US); Art Didyk, Chicago, IL (US); Nick DeFrancesco, Sugar Grove, IL (US)

(73) Assignee: Components Express, LLC, Woodridge, IL (US)

( * ) Notice: Subject to any disclaimer, the term of this patent is extended or adjusted under 35 U.S.C. 154(b) by 192 days.

(21) Appl. No.: 18/641,358

(22) Filed: Apr. 20, 2024

(65) Prior Publication Data

US 2025/0298291 A1 Sep. 25, 2025

Related U.S. Application Data

(60) Provisional application No. 63/569,137, filed on Mar. 23, 2024.

(51) Int. Cl.
| | |
|---|---|
| *G03B 17/55* | (2021.01) |
| *F16J 15/3248* | (2016.01) |
| *G03B 11/04* | (2021.01) |
| *G03B 17/12* | (2021.01) |
| *G03B 17/56* | (2021.01) |

(52) U.S. Cl.
CPC .......... *G03B 17/55* (2013.01); *F16J 15/3248* (2013.01); *G03B 11/041* (2013.01); *G03B 17/12* (2013.01); *G03B 17/561* (2013.01); *G03B 17/565* (2013.01)

(58) Field of Classification Search
USPC .......................................................... 348/46
See application file for complete search history.

(56) References Cited

U.S. PATENT DOCUMENTS

| | | | | |
|---|---|---|---|---|
| 2001/0036619 A1* | 11/2001 | Kerwin | .................... | G09B 7/02 |
| | | | | 434/118 |
| 2009/0114442 A1* | 5/2009 | Berst | .................... | H01R 13/025 |
| | | | | 174/74 R |
| 2020/0076991 A1* | 3/2020 | Berst | ...................... | H04N 23/56 |

\* cited by examiner

*Primary Examiner* — Nigar Chowdhury
(74) *Attorney, Agent, or Firm* — Chris Tanner; BlueCollarIP.com

(57) ABSTRACT

A compact and electrically grounded enclosure facilitates locating a board stack assembly camera inside and can be rated IP67 or higher. The enclosure has connectors integrated ended in the back bezel of the enclosure and a front lens mount that allows for the direct assembly of interchangeable lens covers. The purpose of the enclosure is to take an existing board stack and locate it within the enclosure thereby forming a camera assembly. The enclosure and its packaging have improved interchangeability of the lens covers and back pieces, as well as heat transfer. Methods for assembling and mounting the board stack within the enclosure and securing the enclosure are also disclosed.

20 Claims, 24 Drawing Sheets

O-ring 148        board stack        O-ring 148 cylindrical guide 120

(skeletal view, numerous elements intentionally omitted)

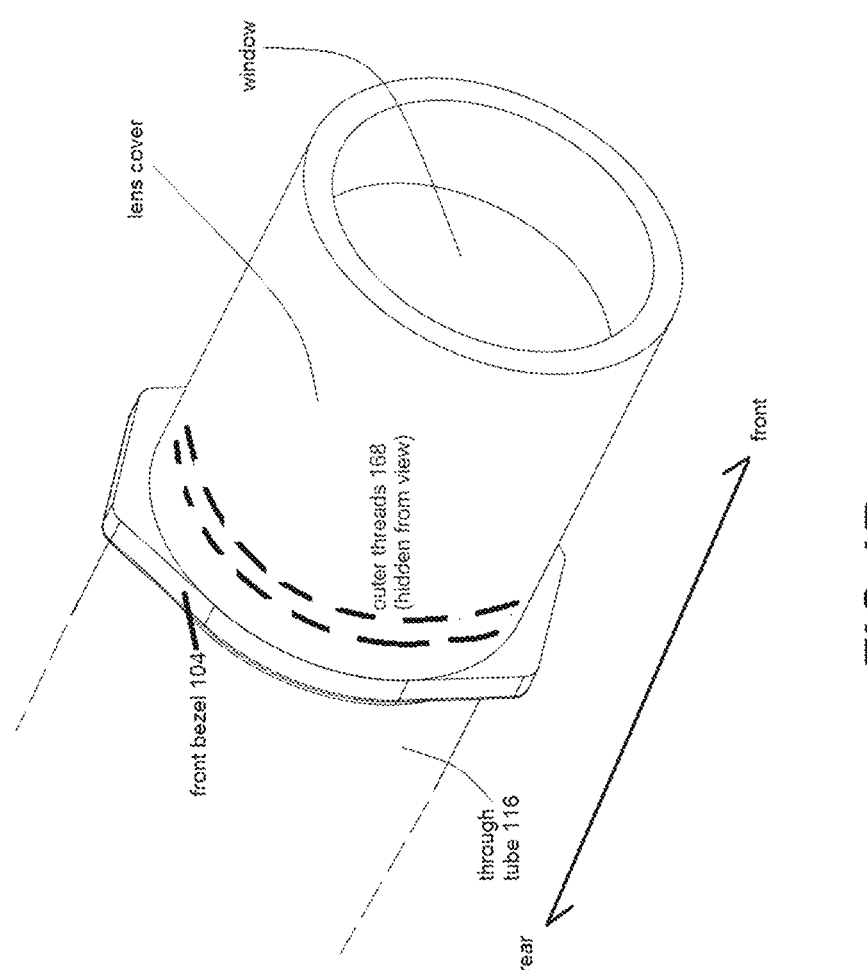
window
lens cover
outer threads 168
(hidden from view)
front bezel 104
through
tube 116
front
rear
FIG 1B ( back-bezel intentionally omitted )

board stack front    back (rear)

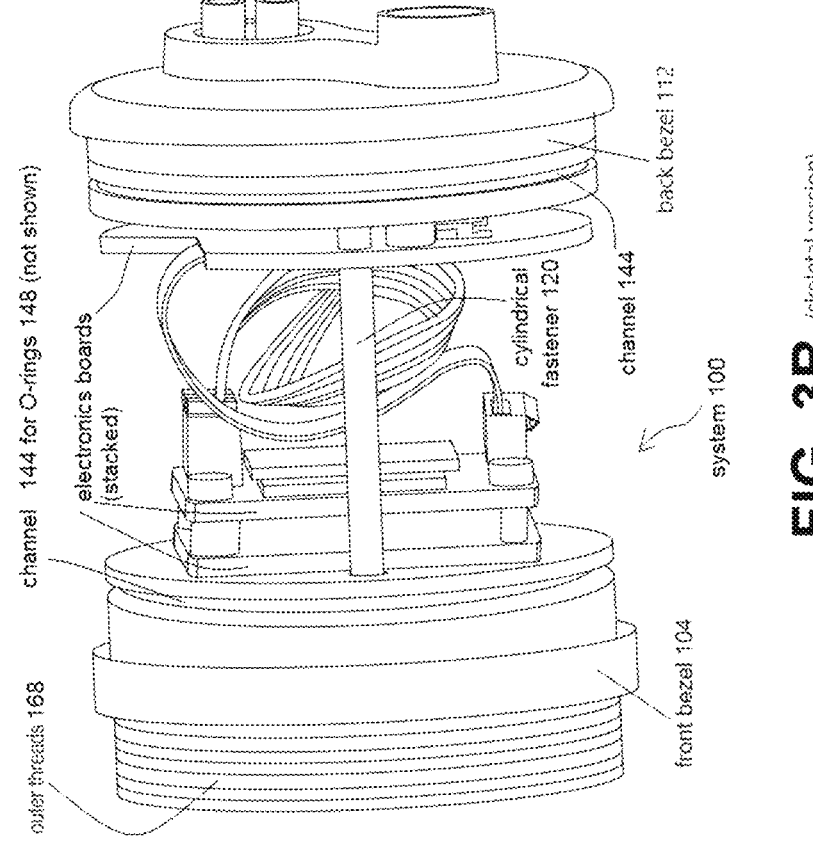
FIG. 3B (skeletal version)

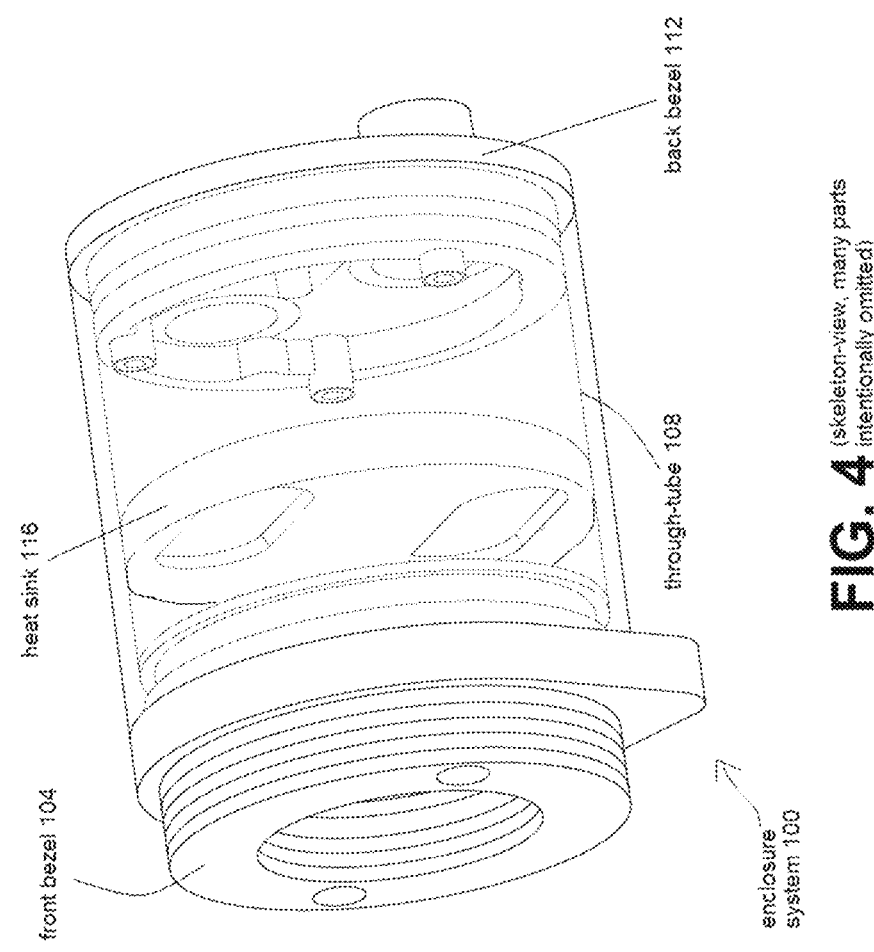
heat sink 116
front bezel 104
back bezel 112
through-tube 108
enclosure system 100
FIG. 4 (skeleton-view, many parts intentionally omitted)

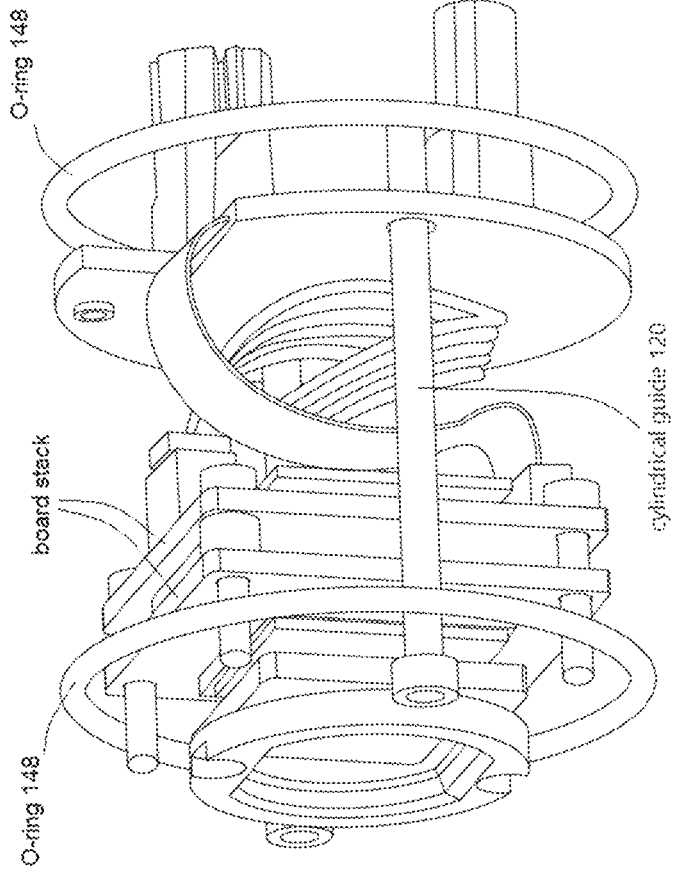
O-ring 148
board stack
O-ring 148
cylindrical guide 120
FIG. 5  (skeletal view, numerous
elements intentionally omitted)

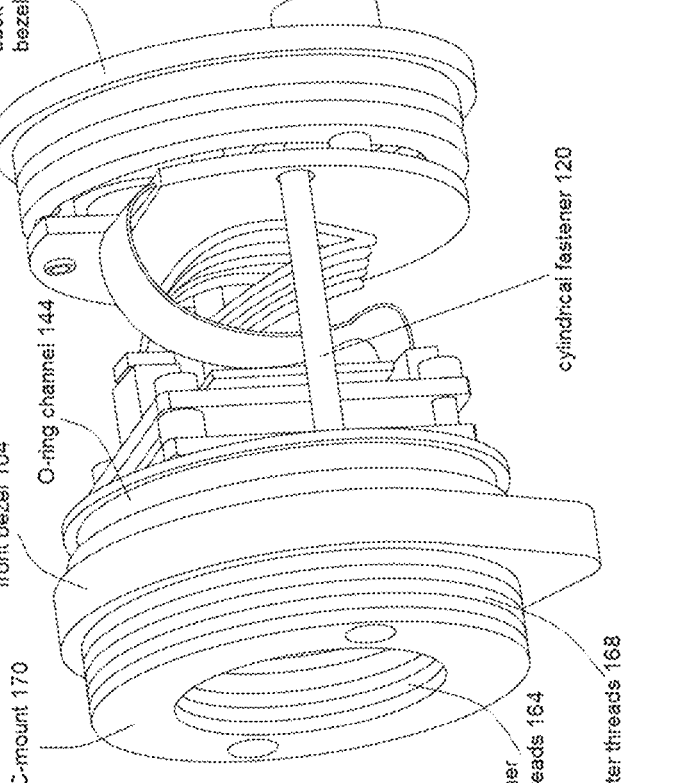
back (rear)
bezel 112
cylindrical fastener 120
O-ring channel 144
front bezel 104
C-mount 170
inner
threads 164
outer threads 168
FIG. 6A (skeletal view, numerous
items intentionally omitted)

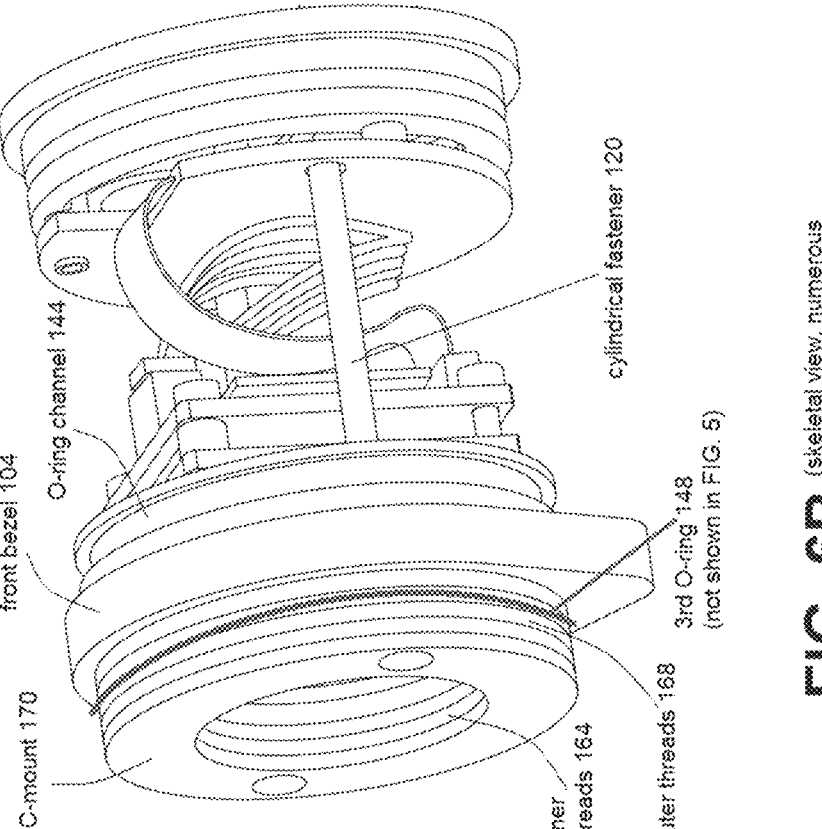
front bezel 104
O-ring channel 144
C-mount 170
inner threads 164
outer threads 168
3rd O-ring 148
(not shown in FIG. 5)
cylindrical fastener 120
FIG. 6B (skeletal view, numerous items intentionally omitted)

heat dissipating portion 1004
of many conventional boardstacks boardstack

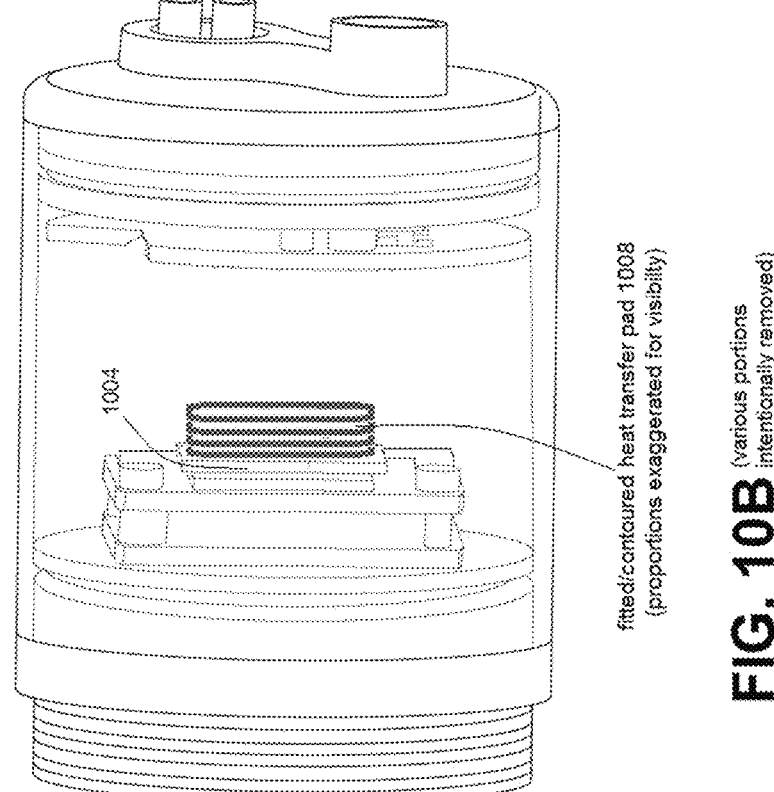
1004
fitted/contoured heat transfer pad 1008
(proportions exaggerated for visibility)
FIG. 10B (various portions
intentionally removed)

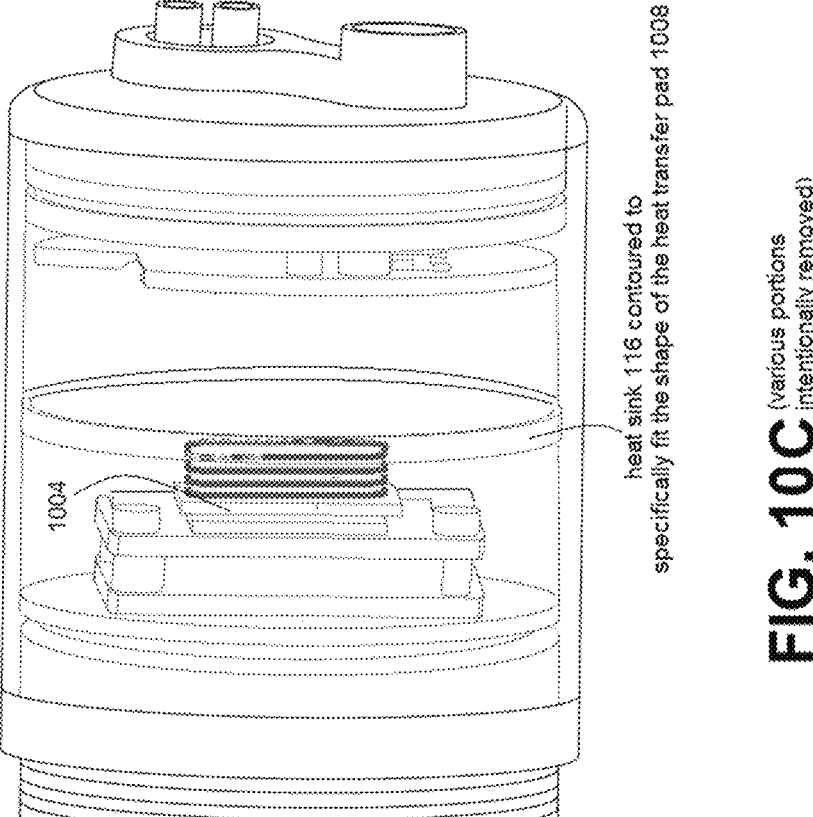
heat sink 116 contoured to
specifically fit the shape of the heat transfer pad 1008
FIG. 10C (various portions
intentionally removed)

front bezel 104

C-mount 170

(example of two heat sinks 116)

Front bezel 104

Outer Thread 168

Step-ring
(step adapter)

C-mount 170

ENCLOSURES FOR ACCOMMODATING BOARD STACKS

BACKGROUND OF THE INVENTION

Earlier, a camera manufacturer would build and sell a whole finished product (e.g. lens, board-stack, and enclosure) as a "camera". But this was a hardship, as briefly discussed with reference to FIG. 13A (Prior Art). A company with camera and board-stack expertise may not have the expertise for fabricating enclosures, which is a substantially different skill-set. Consequently, an improved business model for camera enclosures is desired.

SUMMARY OF THE INVENTION

Earlier, a camera manufacturer would build and sell a whole finished product (e.g. lens, board-stack, and enclosure) as a "camera". Instead, using the enclosure system(s) 100, board manufacturers can design their board-stacks however they need and have reasonable assurance these board stacks will fit directly into the enclosure system 100, and then truly call it an IP-rated "camera" as that word is used within the industry, e.g. ready-to-sell, ready-to-use, and IP-67 compliant.

The embodiments herein comprise novel enclosures for existing board stacks. These enclosures and packaging have increased capabilities, including improved interchangeability of the lens covers and bezels, as well as heat transfer. Using the embodiments herein, camera manufacturers can take an existing board stack and locate it within a compact and electrically grounded enclosure, and then also make it rated IP67 or higher. Suitable connectors can be integrated ended in the back bezel of the enclosure and a front C-mount that allows for the direct assembly of interchangeable lens covers. This all facilitates locating a board stack assembly camera inside.

The embodiments herein are meant to be sold to (or specifically designed for the board stacks of) companies that are already making cameras (albeit with lens separated) and/or embedded vision systems. That company may make the camera, including the electronics e.g. board-stacks, but often does not make the enclosures described herein. Thus various cameras, lenses, and board-stacks to be located inside an enclosure are shown at many places herein, but are act more as workpieces rather than parts of the embodiments herein.

BRIEF DESCRIPTION OF THE DRAWINGS

FIGS. 1A, 1B, and 2 show portions of an enclosure system according to an embodiment;

FIGS. 3B and 3C show a skeletal view of an enclosure system;

FIG. 4 shows an embodiment of an enclosure system;

FIG. 5 shows an embodiment of an enclosure system;

FIGS. 6A-6B show embodiments of an enclosure system;

FIG. 10A-10B-10C-10D shows details of a heat sink in an embodiment;

DETAILED DESCRIPTION OF THE PREFERRED EMBODIMENTS

Figure 1A:
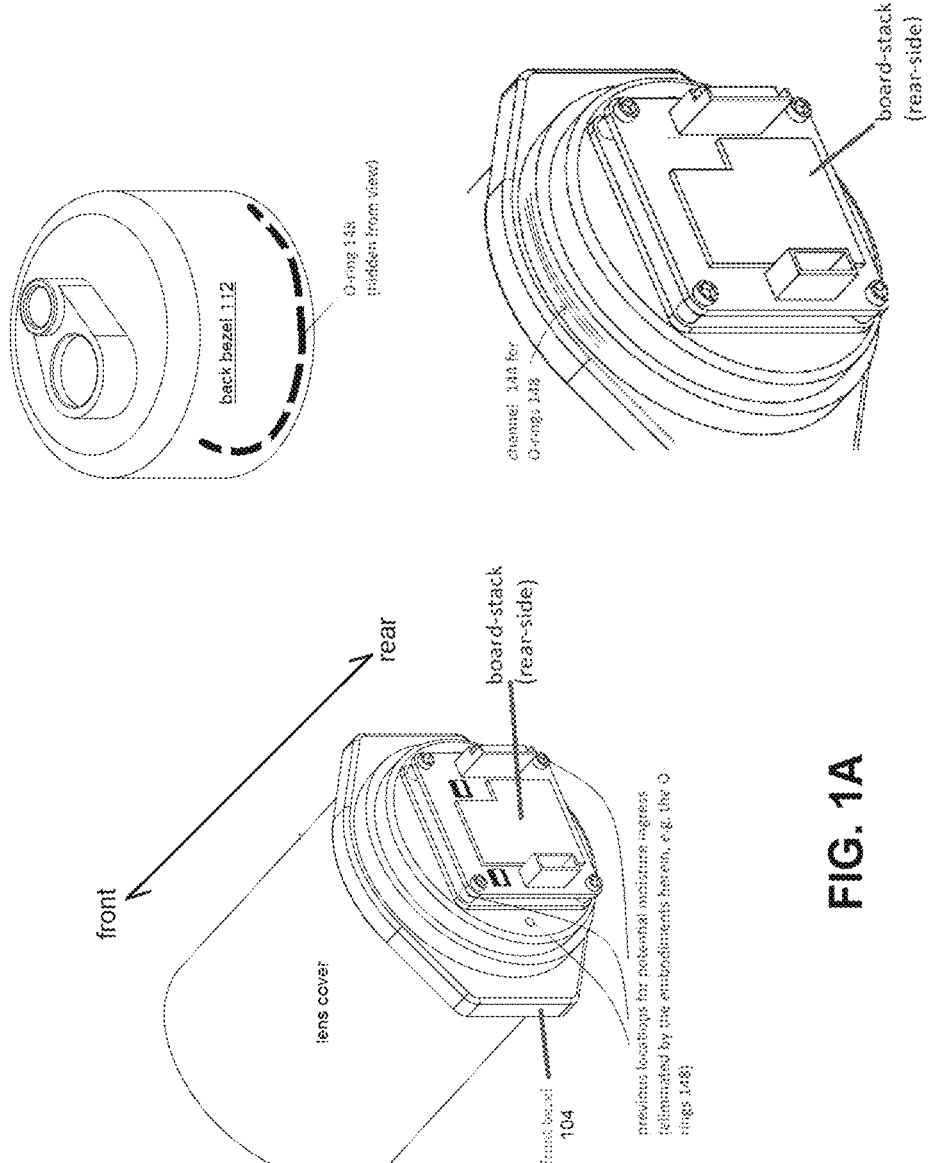
Figure 2:
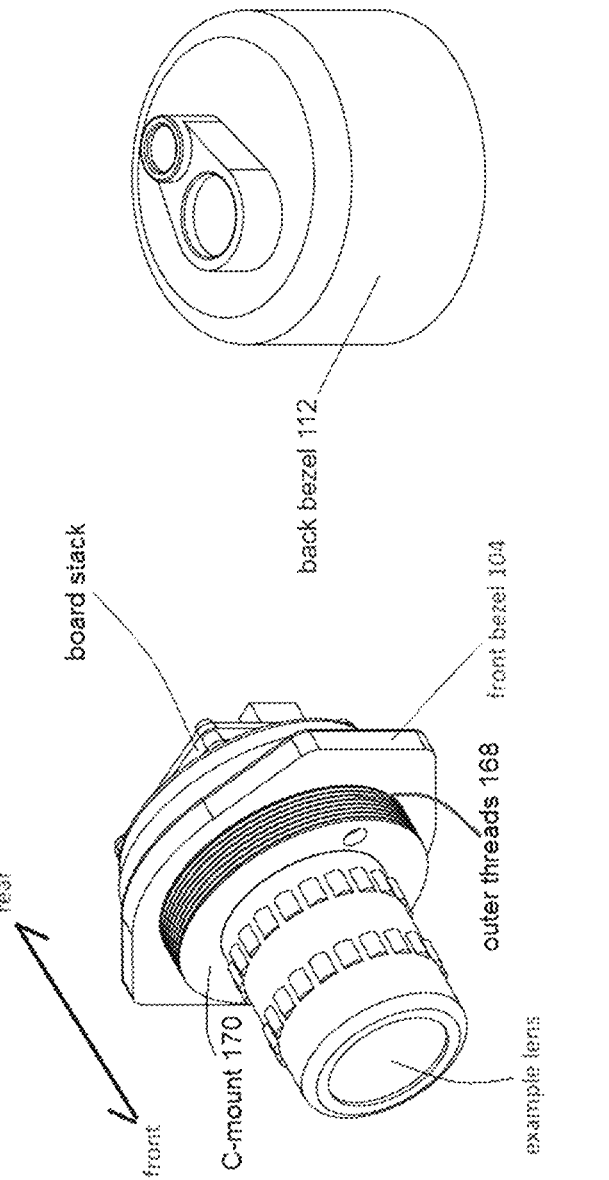

FIGS. 1A-1B and FIG. 2 show various components within the system(s) 100 in a dis-assembled state, to make the individual components easier to recognize. For example, a lens cap is shown attached from a front bezel 104. Within FIG. 2, the outside threads 168 of the C-mount 170 are for mounting of the lens cap. The inner threads 164 (obscured from view in FIG. 2) are for mounting of the lens itself.

Figure 3A:
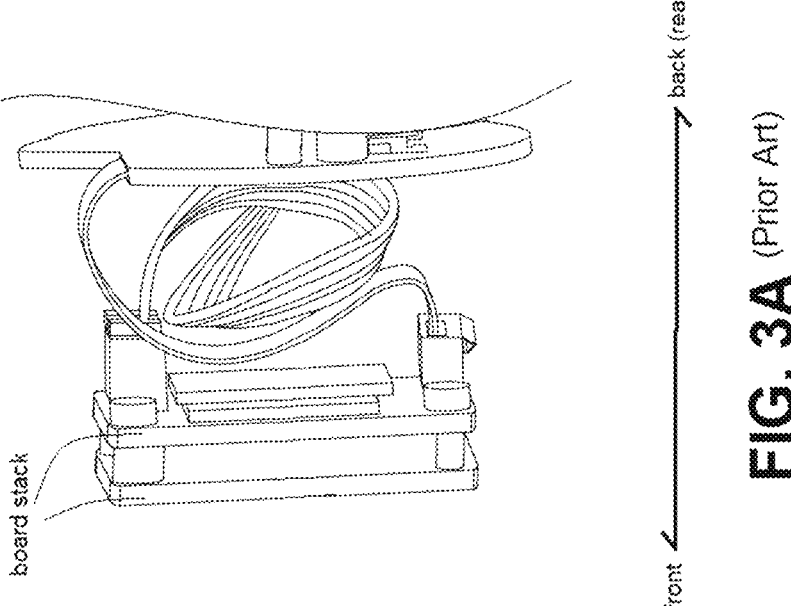
FIG. 3A shows a Prior Art board stack.
Figure 3C:
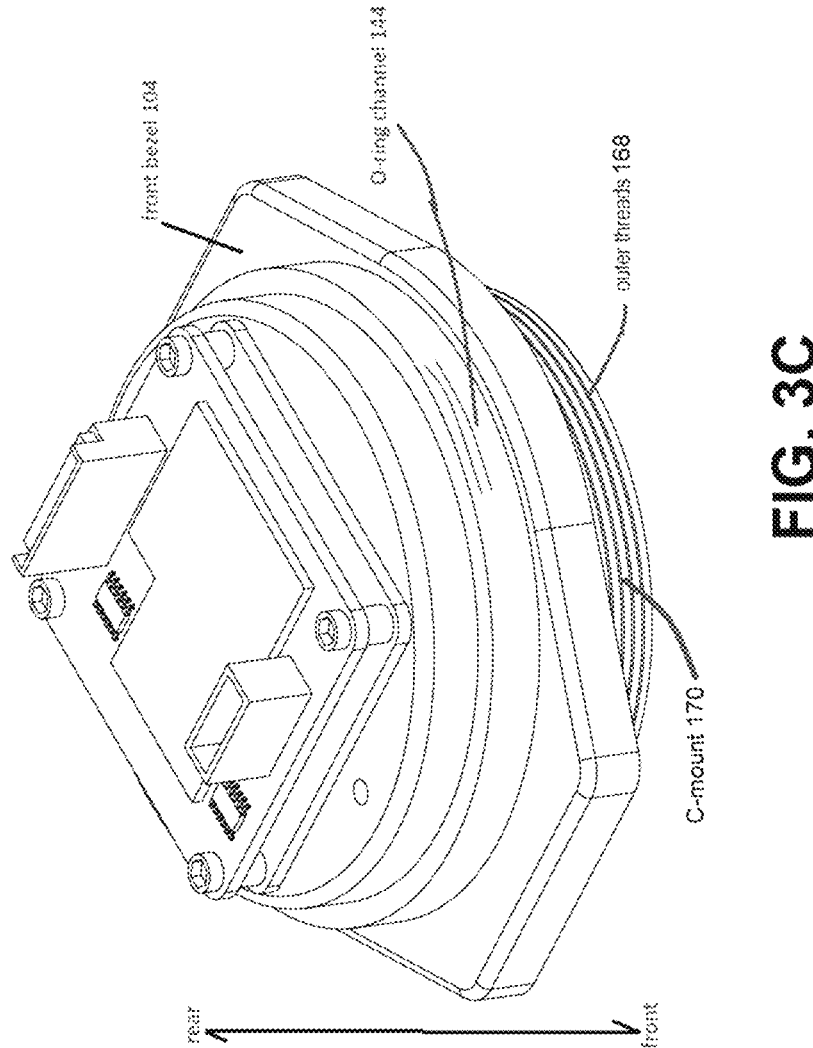

FIG. 3A (Prior Art) shows a conventional board stack. FIG. 3B shows a skeletal view of a system 100 incorporating such a board stack, but with many elements intentionally not shown, mainly to emphasize\clarify the fastening guides 120 and the O-ring channel(s) 144. FIG. 3C shows a close-up view of the combination of C-mount 170 and the front bezel 104.

Figure 7:
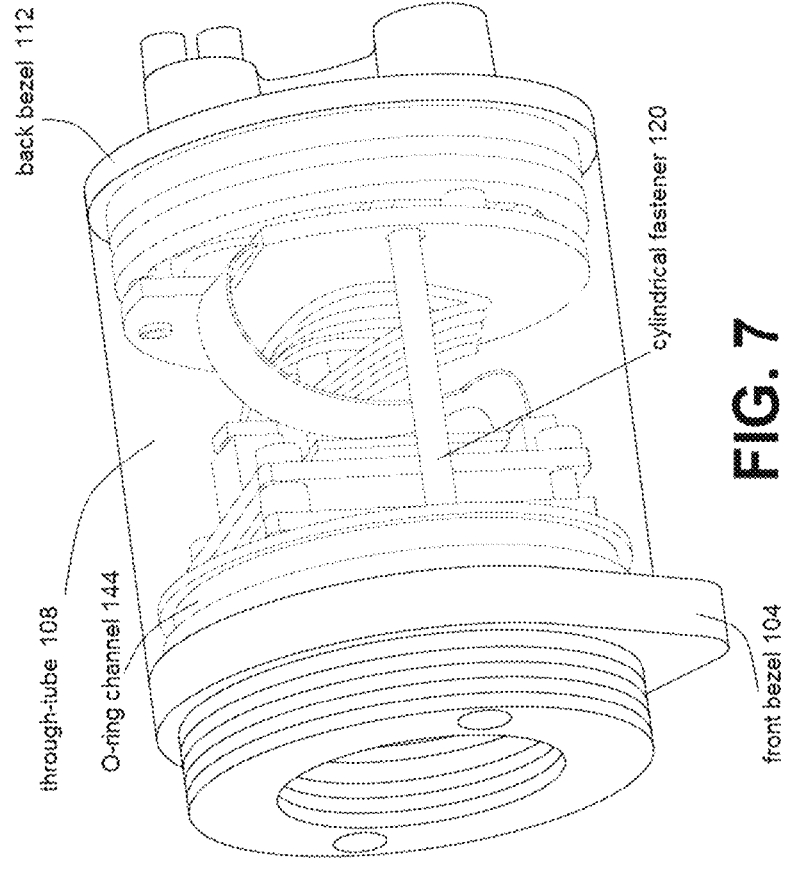
FIG. 7 shows an embodiment of an enclosure system.

As shown at least within FIGS. 3B and FIGS. 6-7, within the through-tube 108 are cylindrical fastening guides 120. The fastening guides 120 may be screws, or could be other mechanisms or elements, and could be hollow where threaded screws occupy the center. The fastening guides 120 connect the front bezel 104 and back bezel 112, but may also act as some type of mechanical reinforcement, and can also assist in heat-transfer. In an embodiment, the cylindrical guides 120 could help locate those threaded screws into place as opposed to being just free-moving. This in turn might help with an assembly process of the system 100, specifically help fool-proof the assembly process.

FIG. 4 shows an embodiment of the enclosure system 100, where a board-stack is located within an enclosure system 100. This is sometimes referred to as a board level "camera" even though no camera lens is shown. As such, within this disclosure, the word "camera" is used somewhat outside of its conventional meaning.

Within FIG. 4 the enclosure system 100 comprises a front bezel 104, a body tube AKA "thru-tube" 108, a back bezel 112, a heat-sink 116, and one or more cylindrical fastening guides 120. In many embodiments herein, the heat sink 116 is integrally molded within the thru-tube 108, but within this disclosure will be discussed as a separate element because the heat sink 116 has varying properties, varying locations, and in some cases has features independent of whatever through-tube 108 it is located within.

Within FIG. 4, the thru-tube 108 is shown mostly in transparent outline only. Throughout this disclosure, such transparency is necessary because illustrating the components herein and their inter-relationships is very difficult without such cut-away, transparent, and/or skeletal views.

Additionally, within this disclosure, a C-mount 170 can be directly integrated within a front bezel 104. However, not all embodiments integrate these pieces. Therefore, the C-mount 170 will be referred to separately from the front-bezel 104, although from the various drawings it will be apparent that the two are either joined or certainly positioned very close to each other. Conversely, various of the embodiments herein can comprise a single piece front bezel 104 having both a lens mount 170 and a lens cover mount. This is a departure from tradition and makes the system adaptable to both IP-rated and non IP-rated applications. Additionally, while the expression "C-mount" may be close to synonymous with a lens mount, some lenses cannot be accommodated by a C-mount. Thus, within this disclosure, the element 170 will be referred to as a C-mount 170.

A purchaser of the system(s) 100 (e.g. camera manufacturer) can attach a standard lens directly onto the lens mount 170, front bezel 104, and/or can add a lens cover to the outer threads 168 and keep it completely IP67-compliant. It is also possible to change out the back bezel 112 to facilitate different connectors, again while remaining IP67 compliant. For example, a company focused mostly on electronic design and programmability can make an IP-rated Gigabit Ethernet camera, a USB camera, a coax camera, or a CLHS camera all by using the enclosure system(s) 100 described herein.

Within this disclosure, it will be an operating assumption that an IP rating, preferably IP-67, is desired. However, various of the embodiments herein can also be assembled without any IP rating.

C-Mount 170, F-Mount, S-Mount

It is well-known and conventional that the inner threads 164 of the C-mount 170 are used for connecting a camera lens. While not shown in any FIGS herein, there also exist S-mount and F-mount standards, having different size threads and different depths than C-mount. A board stack usable within the enclosure system(s) 100 described herein could also have S-mount and F-mount features, not just C-mount. Certain lenses are only available in certain sizes. Many telescopic lenses that are out there that are on an F mount platform and there's a lot of macro lenses on more of the microscopic side or super wide angle fields of view, e.g. striving for above 180 degrees field of view. These lenses can be short and stubby. As such, the embodiments herein contemplate multiple diameter covers and multiple lens mounts, depending on the variation needed, but whichever mount whether F-mount S-mount or C-mount, all would have the outer threads 168 for attaching lens covers.

The inner threads 164 on the C-mount 170 are a known C-mount standard, but the outer threads 168 of the C-mount 170 are proprietary and advantageous. Within the embodiments herein, the C-mount (lens mount) 170 is embedded into the front bezel 104 such that these are sometimes considered as the same part. This is another reason why the expression "lens mount" is avoided for the element 170, as that would be an oversimplification.

The lens cover is not part of the front bezel 104, although in some drawings it is hard to see where these are separated. Instead, as shown at least within FIG. 1B, the lens cover connects to the front bezel 104 on the outer threads 168 of the C-mount 170. As stated, a conventional C-mount is packaged only with inner threads 164.

FIGS. 5, 6A, 6B, 7, and 8 shows skeletal partial views of a system 100, with various items removed and various other items included, depending on the specific view.

O-Rings 148

Within the enclosure system(s) 100, there are typically three O-rings 148 located at a front and back of the enclosure system 100, and within the outer threads 168. An O-ring 148 at the base of those outer threads 168 (see FIGS. 6A-6B) acts to seal various parts e.g. lens caps and thus preserve IP67 compliance. Another advantage of the O-rings 148 is that in the past, moisture might ingress through a hole in the C-mount 170 where a lens is normally threaded into, as shown in FIG. 1A. The system(s) 100 resolve that issue using an O-ring 148 on the C-mount 170.

Additional O-rings 148 above the three shown in FIGS. 5 and 6 could act as a thermal dissipation (heat transfer) devices. One concept of a board stack is that the camera-board mounts to the front, and any back board is mainly for connecting a cable that exits through the back bezel 112. Normally that's what the back side of the board stack is used for. However, the embodiments herein facilitate heat dissipation from the front end towards the back end of the enclosure system 100. Thus, the embodiments herein can accommodate a wide variety of board-stack arrangements.

Using the systems 100 herein, a board-stack designer can skip a step of buying a secondary enclosure in order to achieve IP compliance. Instead, when a system 100 arrives to a camera manufacturer, that customer can instantly use Applicant's accessories. This will permit channel partners to more easily support a camera for an IP-rated application, as well as everything else that's already in Applicant's corollary product lines. To that end, FIG. 8 shows a non-limiting group of accessories.

Figure 8:
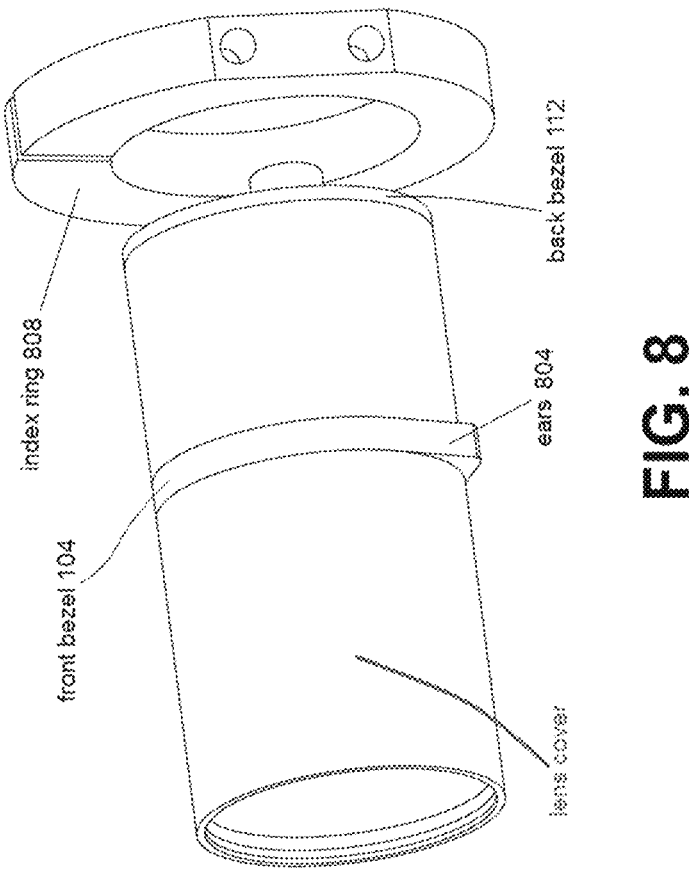
FIG. 8 shows accessories for an enclosure system.

FIG. 8 shows mount (index) rings 808 which have ability to rotate attachments around. Users can rotate a tube to position a clock or a light. To achieve such rotation about a cylindrical version of an enclosure system 100, users can attach the index ring 808 and clamp anywhere on the through-tube 108. For example, FIG. 8 shows one or more ears 804 which can be included in a system 100. Without the ears 804, a user can't mount a spin-ring directly to anything, as users would have no way to grip it.

The embodiments herein can introduce features that makes it better or more suitable for mass production or upgrades. The embodiments herein facilitate a much wider spectrum of accessories, including mechanisms for mounting a light.

Figure 9A:
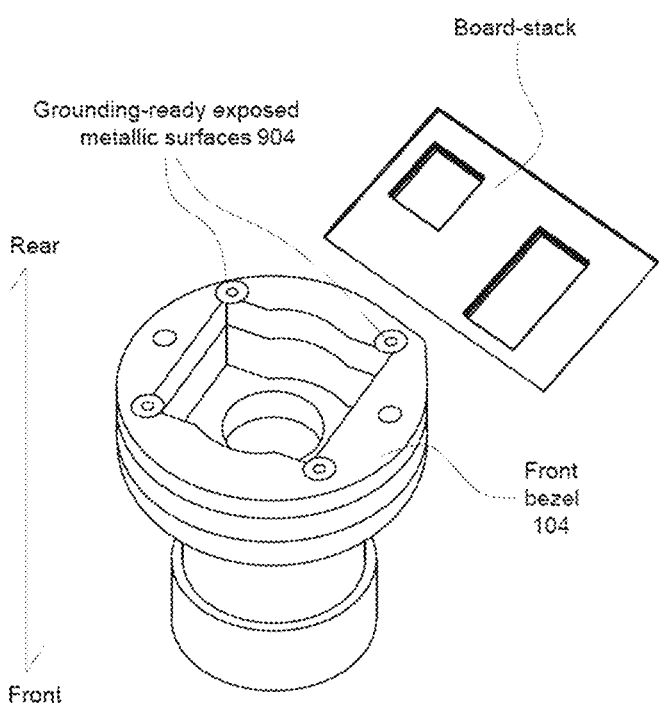
FIGS. 9A-9B shows an embodiment in a dis-assembled state.
Figure 9B:
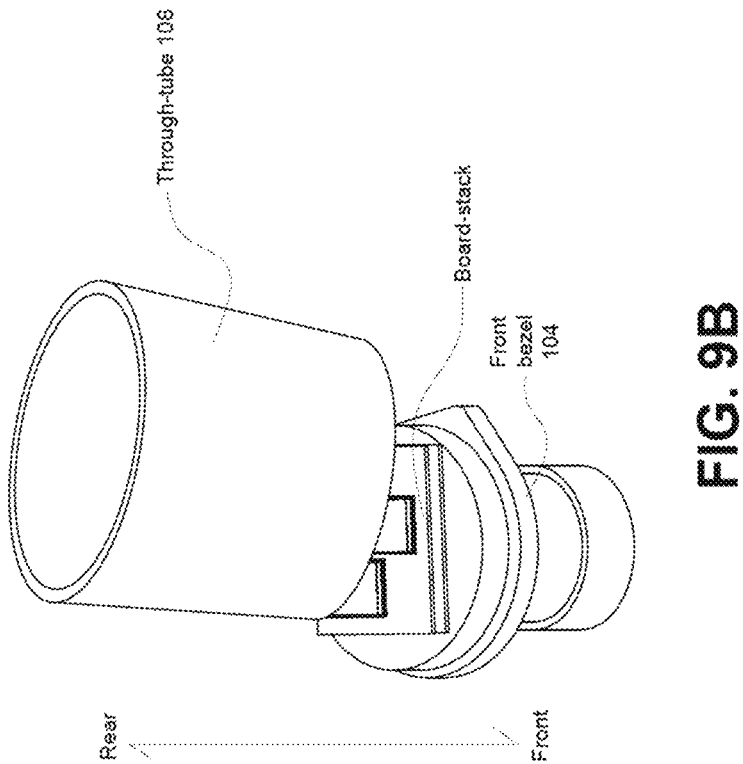

FIGS. 9A-9B show a potential way of assembling various components of a system 100, using human fingers as a type of illustrative reference point and size-comparison. FIG. 9A shows the rear side of the front bezel 104 having exposed grounding surfaces 904. Although not shown, the rear bezel 108 also contains grounding-ready metal surfaces.

Shapes of Heat Sink 116

FIGS. 10-12 provide detail and potential variations of the heat sink 116. Certain portions of FIGS. 10B-10C are size-exaggerated for clarity, such as the heat transfer pad 1008. Specifically, FIGS. 10A-10B-10C show various embodiments of heat sinks 116 sitting inside of an example system 100. As shown in FIG. 10A, many board stacks are equipped with a heat dissipating portion 1004. As shown at least within in FIGS. 10B-10C, the heat dissipating portion 1004 is in contact with a heat transfer pad 1008 which helps dissipate heat to the heat sink 116. An embodiment of the heat sink 116 has an aluminum body since that composition is suitable for heat transfer. That heat transfer pad 1008 will always stay in contact with the heat sink 116, and ideally will also be permanently attached to the heat dissipating portion 1004. The hottest portion of any particular board stack is typically a processor, shown in FIG. 10A as the heat dissipating portion 1004.

The embodiments herein may have one heat transfer pad 1008 to press up against the heat dissipating portion 1004, or perhaps more than one. For clarity, FIGS. 10B-10C show the heat transfer pad 1008 in an exaggerated size and thickness. FIG. 10C attempts to show the heat transfer pad 1008 in direct contact with the heat sink 116. The main reason for the heat transfer pads 1008 is flexibility, as the heat sink 116 works mainly through thermal conduction. The heat transfer pads 1008 could be at multiple heights or levels but could be arranged to all push against a single plane of a heat dissipation portion 1004, or the heat dissipation portion 1004 could have a multi-planar surface. While unlikely, this embodiment is possible, as there are many different board-stacks in many different shapes and contours. Thus, the various depictions of the heat sink 116 and heat transfer pad 1008 are not limited by what is shown in the Figures, and may have other shapes.

A heat dissipation portion 1004 is generally found on the back side of the board stack enclosure. As such, the heat pad 1008 will typically be located on top of a processor within the board stack, but can be located in a variety of places and can have varying position, shape, and contour. Thinking of a board stack as a series of stacked planes, the thermal transfer pad 1008 will typically be located at the highest plane of a board stack.

Figure 10A:
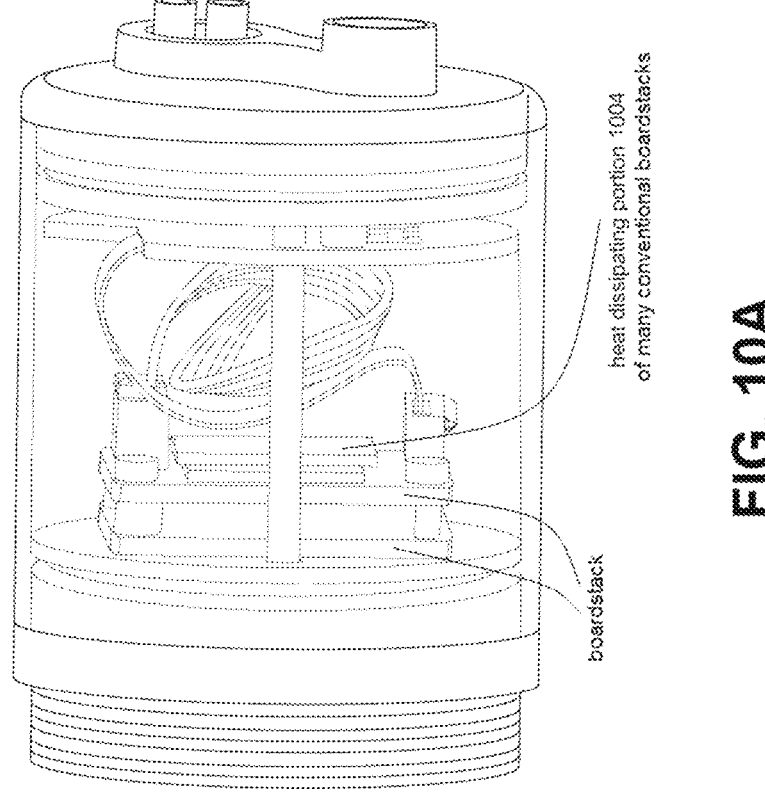
Figure 10D:
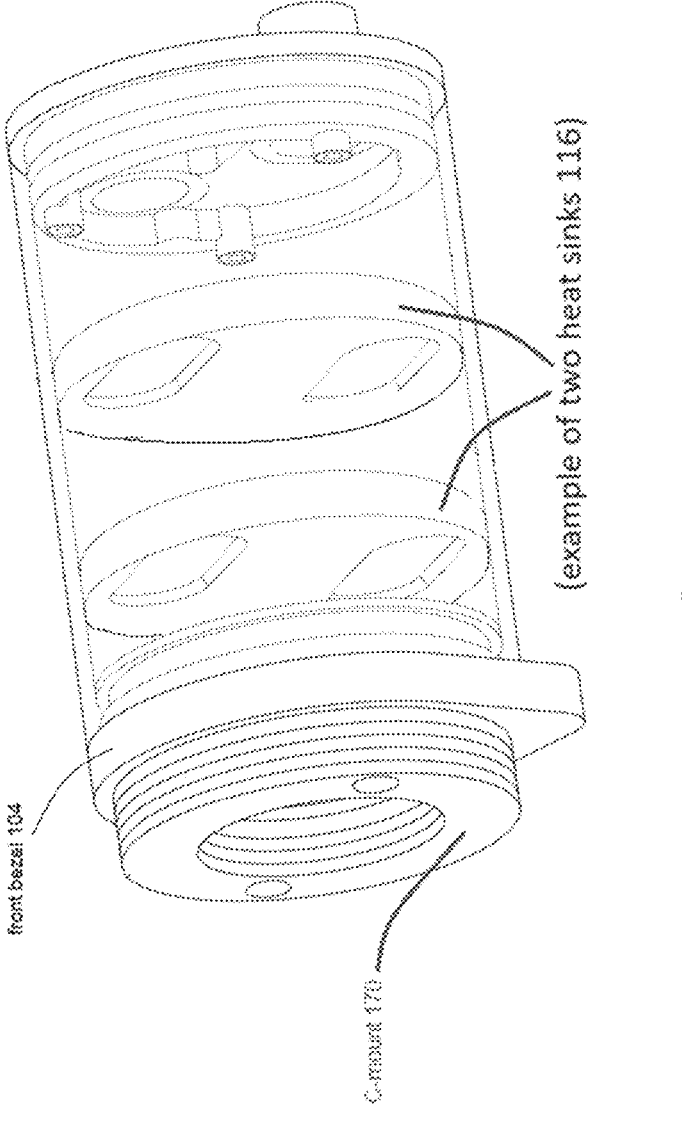

While unusual, is it possible that both the front and rear portions of a board stack will generate heat and thus each need a heat sink 116 (FIG. 10D). The main focus of the embodiments herein will be on the back (rear) side of any board stack. While heat can be generated from both sides, it's difficult to place thermal pads on the front side of a board stack. That sensor plane alignment on the front side can be. e.g. four decimal places of precision, so no compounds can be on the front, as doing so would a) obscure the camera and b) perhaps prevent the camera from sitting flush.

That's why the heat transfer pad 1008 is mostly shown herein as being located on the back (rear) side of the board stack. In most embodiments, all heat is transferred out of the back. By way of comparison, passenger cars typically only have one radiator, although heat can be everywhere. In both cases, one radiator (or heat pad 1008) is typically sufficient. Heat is still being taken out the front side of the board stack, but just at a lesser rate. The heat pad 1008 is just helping it to evacuate more quickly. Ideally, the heat transfer pad 1008 is made from a spongy material, to achieve as much contact as possible with the heat dissipation portion 1004 and also heat sink 116.

Formation and Materials of Heat Sink 116

In an embodiment, the entire enclosure system 100 or the front bezel 104 or rear bezel 112 can be made from 6061 T6 aluminum, which is low-cost and strong. Some enclosure systems 100 will be used within outdoor products e.g. farming equipment. Thus, durability is needed. If a customer required, the bezels 104/112 e.g. could potentially be made from stainless or titanium.

It is possible to form the heat sink 116 and through tube 108 separately, then fit them together later on. This is especially helpful if multiple heat sinks 116 are contemplated (see FIG. 10C). These the heat sink 116 and through tube 108 can be made of the same material, or can be of different material, and then fitted together later on. One example would be a through tube 108 being stainless, and the heat sink 116 being aluminum.

Various embodiments machine the through tube 108 and the heat sink 116 all in one piece using a turn mill. One can bore out both sides with a lathe, use live tooling and cut out the inner aperture/window shapes 140 using an end mill. One can also put spacers on the back so the overall enclosure system 100 to help it sandwich together and hold its position. It's also possible to include springs to help items hold their position, and to ensure proper "make" of electrical contact e.g. for grounding. Could use adhesives and glues as well.

For convenient viewing and simplicity, the various drawings default to two cylindrical connectors 120 which is why the heat sink 116 is often drawn with two holes. The number of holes or apertures within the heat sink 116 should correspond with the number of connectors on the back bezel 112.

The heat sink 116 will likely be made from aluminum, as not a lot of substitutes are available. Could possibly do a substitution of stainless, but this material is weak for dissipating heat, where copper is even worse. Any substitute would likely be a composite that has some aluminum therein. One embodiment uses 6,000 series aluminum, but the embodiments herein could also work 7000 series, 5000 series, even 2000 series of aluminum.

Figure 11A:
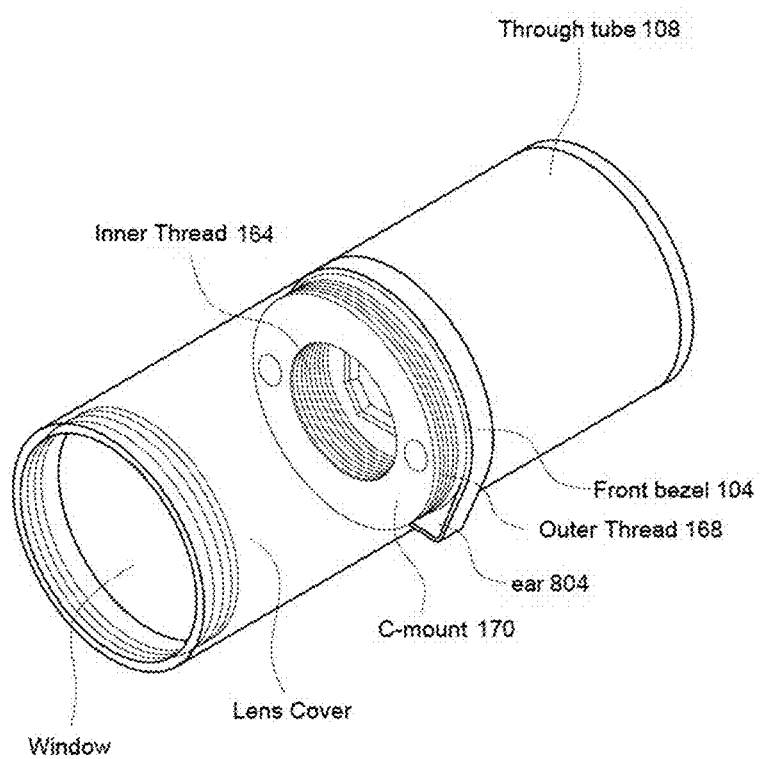
FIGS. 11A-11B show embodiments with accessories attached.
Figure 11B:
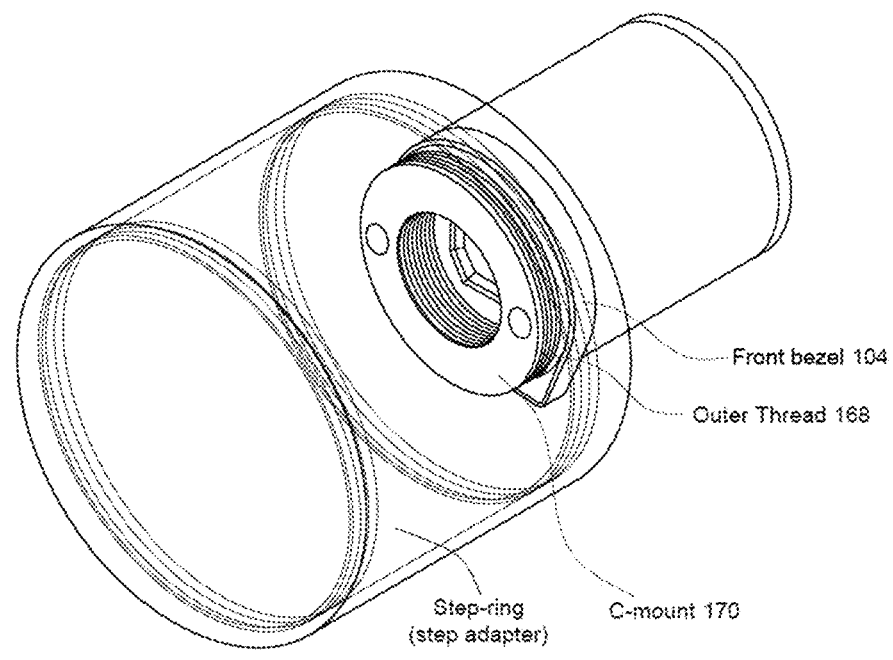

FIG. 11A shows a transparent view of an embodiment with a lens cover attached. FIG. 11B shows a transparent view of an embodiment with a step-ring attached.

Additionally, unlike other enclosures which are set in a one-diameter mode, the various enclosure system(s) 100 described herein can work with various adapter pieces to accommodate a plethora of different diameters and geometries. One can put adapter pieces on the outside of the front bezel 104 for example to make it a larger and put a large lens cover on it. One non-limiting way to achieve this is using step-ring adapters. An example step-ring adapter is shown in FIG. 11B.

Figures 12A, 12B:
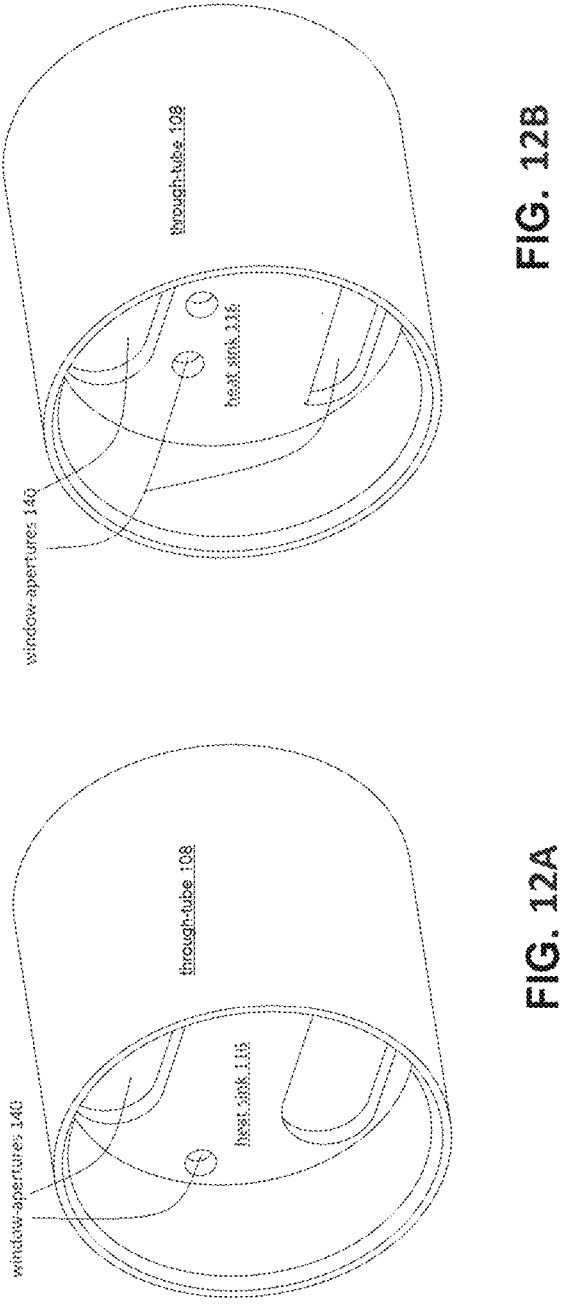
FIGS. 12A-12B-12C-12D show embodiments of heat sinks.
Figures 12C, 12D:
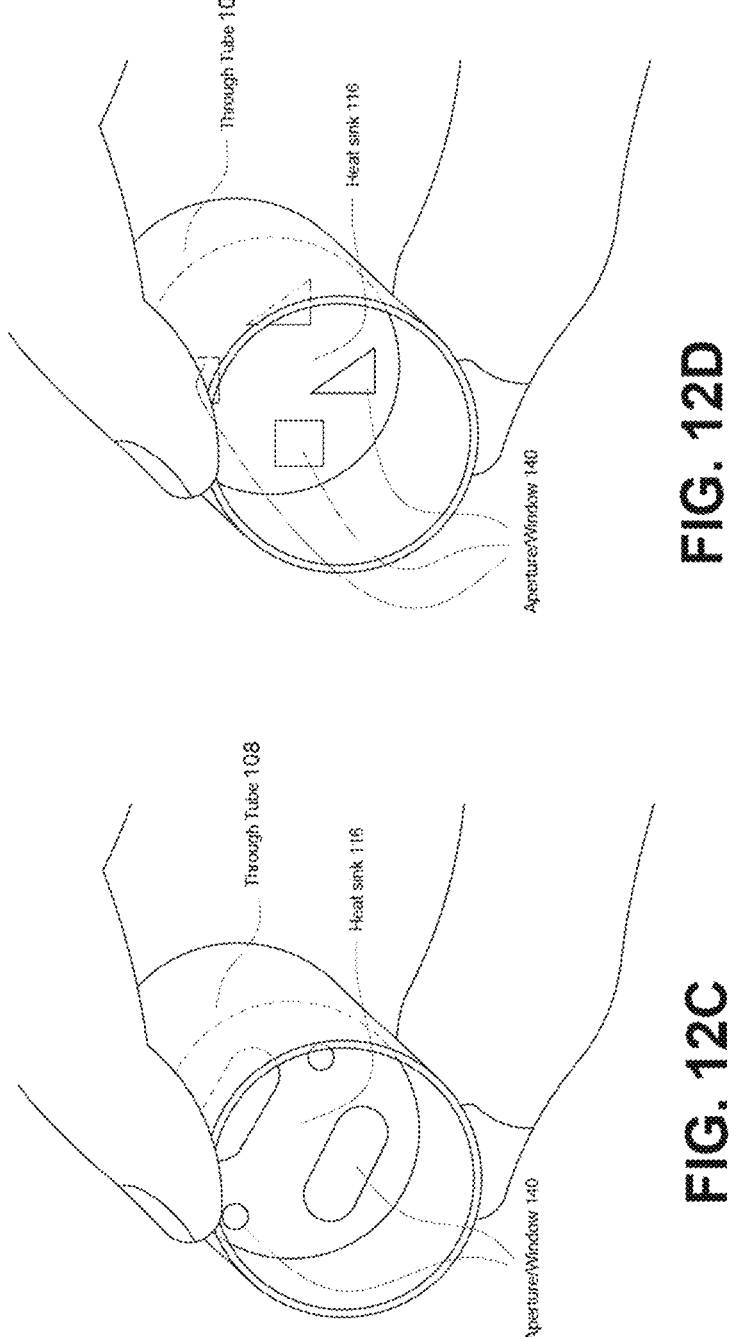

FIGS. 12A-12D show unusual shapes and patterns within the heat sinks 116, perhaps to match an odd size board stack. FIG. 12D shows two squares, two triangles as example windows\apertures 140. The expression "windows\apertures" refers to any opening, either screw holes or the larger openings in the heat sink 116.

However, combining heat sink 116 and through tube 108 in a single unibody construction helps achieve superior thermal transfer. While two-piece construction can work, a single-piece construction ensures less interruption in heat transfer. In FIGS. 12A-12B-12C, two apertures\windows 140 are located within the heat sink 116, while FIG. 12D shows four apertures\windows 140.

Figure 10F:
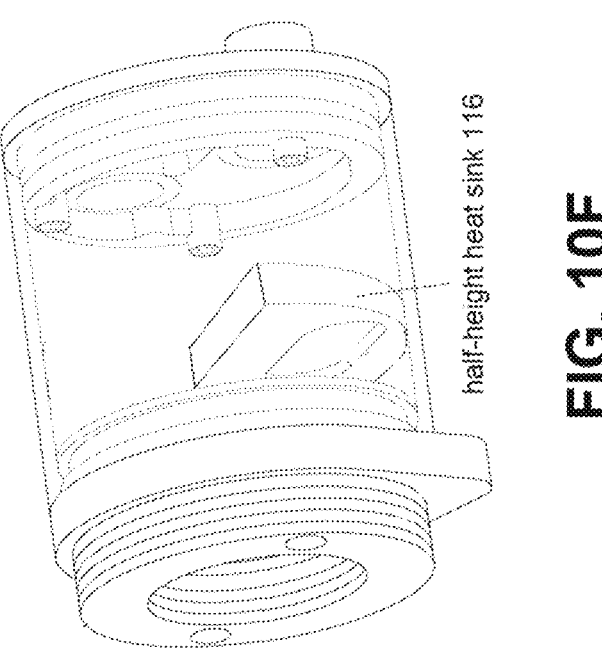
FIGS. 10E-10F show additional embodiments.
Figure 10E:
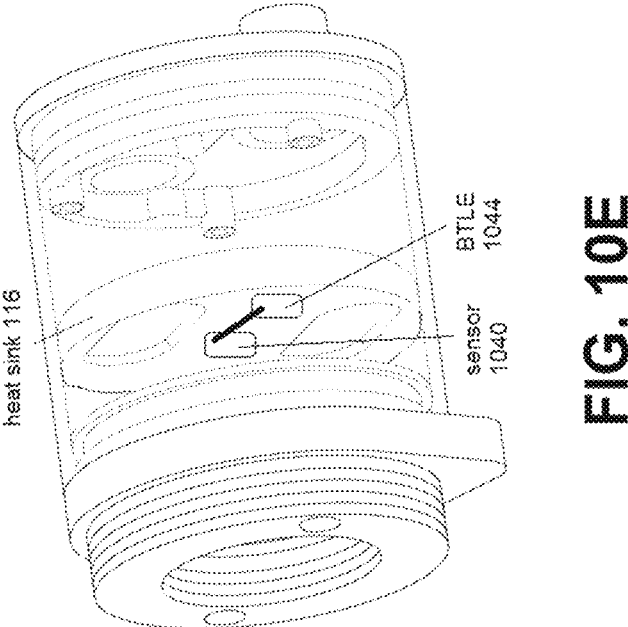

As shown in FIG. 10E, in an embodiment, there can be a sensor 1040 connected to a BTLE transmitter 1044 on the inside of the heat sink 116. This would be for wirelessly conveying e.g. humidity or temperature information, potentially to a mobile app or other display mechanism or data-gathering mechanism. In that embodiment, the sensor 1040 could be wirelessly conveying humidity info inside of the heat sink 116 through the BTLE transmitter 1044. Could emit such data to a mobile app, send e.g. 1 value every minute, every 5 minutes, all wirelessly. No need to do any wiring out the back bezel 112, no need for any wiring. Instead, the implementation of FIG. 10E would communicate with e.g. a mobile app or other wireless listener. Not for controlling the temperature, just monitoring it. This could help detect reasons for a data-fail within the overall camera, as moisture anywhere within an interior of the enclosure system 100 could affect performance. An embodiment could use color-strips within the through-tube 108 that change color according to presence of humidity.

FIG. 10F shows a half-height arrangement of a heat sink 116, added mainly for visual clarity and graphic illustration of the numerous variations contemplated within this disclosure. The heat sink 116 could also have thickness changes, although not directly shown in FIG. 10F. It is also possible to modify the shape of the heat sink 116 for some kind of thermal benefit. FIG. 10C shows two heat sinks 116, which could be achieved using a cast unit and then fitting one or more boards of the board stack in between those two heat sinks 116. Not easy, a "ship in a bottle" problem, but achievable. One way to incorporate two heat sinks 116 might to be to manufacture the various parts in a multi-piece assembly.

Grounding Issues

Grounding is already difficult enough—for board (electronics) designers. Making this grounding problem even worse, enclosure-people often focus more on mechanical issues and don't provide suitable grounding. This limitation puts existing enclosure manufacturers into FIG. 13A (Prior Art). Meanwhile, the enclosure system(s) 100 provide numerous ways to facilitate improved grounding.

For example, various items in the system 100 will have raw exposed surfaces suitable for ground-attachment (e.g. FIG. 9A), such as the surface on the front bezel 104. Same with the back bezel 112. Thus, the system(s) 100 improve enclosure-flexibility. As shown in FIG. 9A, the front bezel 104 and back bezel 112 achieve effective grounding partly through their use of bare metal surfaces, as opposed to anodized surfaces which do not ground as well.

Business Model of the Embodiments Herein

Figures 13A, 13B:
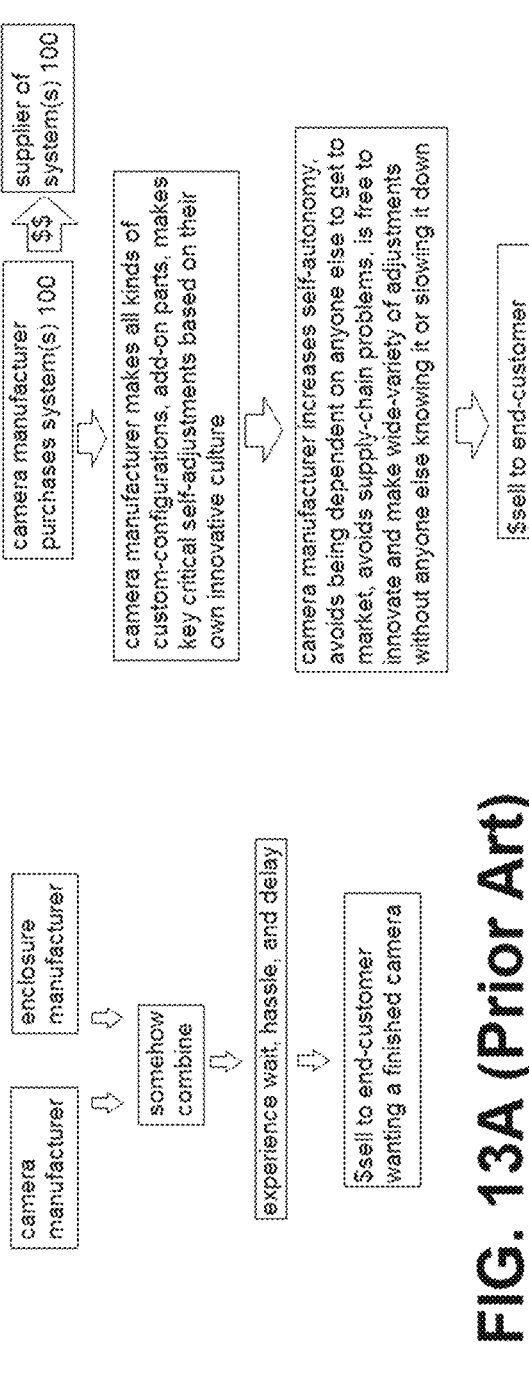
FIGS. 13A-13B show business models compared side-by-side.

As summarized in FIG. 13B, the embodiments herein permit camera manufacturers to quickly manufacture and get to market fully grounded and compact IP-rated cameras with fewer components. They can do this while also preventing an end-user from the tedium of enclosure problems. As such, camera makers, channel partners, and distributors can focus on selling cameras and be less concerned with IP-rated enclosure issues which are time-consuming and complicated since the enclosures for machine vision systems vary significantly in size by maker and model.

Instead, using the embodiments herein, a camera manufacturer can focus on their core competency—quickly adding processors, sensor innovations and programmability into their designs. This is their main source of innovation and revenue. Camera manufacturers can thus "outsource" the mechanical details and headaches of enclosures. At the same time they simplify the sales and design-in challenges of their channel partners and end-users. One way to achieve this is by shipping the board stack from a central point and add the simple IP-rated enclosure close to their end customer so improving cash flow and flexibility.

As shown in FIGS. 13A-13B, Applicant is not making board stacks, and is not assembling them inhouse. Instead, Applicant is sending specialized enclosure parts to a camera builder who then assembles their own IP67-compliant cameras therewithin. These parts include but are not limited to front bezel 104, through tube 108, back bezel 112, heat-sink 116, and cylindrical fastening guides 120. Previously, these companies could not have milled or machined such parts by themselves at any economies of scale.

Existing business models fit within FIG. 13A (Prior Art) more than FIG. 13B. The enclosures of FIG. 13A might reach IP55, perhaps IP56 at best, but this is not sufficient to rise to the IP67 standard that the enclosure system(s) 100 achieve. Meanwhile, the various embodiments of the system(s) 100 differ at least because they are a) self-sealing and thus b) fully meet IP67 right from the jump. Also, the various system(s) 100 described herein can be dis-as-sembled, have modifications done thereto, and yet be re-assembled and still be IP67-compliant.

Within the systems 100 herein, a 3$^{rd}$ party camera manufacturer builds their own camera and makes it IP67-compliant right away. This allows the camera manufacturers to deliver directly from their factory a higher-value IP67 camera that is simpler to install. Thus, the systems 100 give camera manufacturers an improved business model.

To cast the widest net of camera manufacturers possible, the various embodiments of the system(s) 100 will be modular, varying by length and also by heat-dissipation capability, and thus not merely one size fits all. Further, the back bezel 112 will be specially-machined in a variety of contexts. Unique properties can include exposed metal for grounding on the front and/or back bezels 104\112. Another unique property of the embodiments includes adding ways of preventing moisture ingress, thereby providing a more ready-to-install Immediate-IP67 enclosure.

Referring again to FIG. 13B, the system(s) 100 would be sold to a board stack (camera) manufacturer directly, rather than in an add-on context which may introduce error, non-fits, and break IP67 compliance.

A competitor X, trying to emulate Applicant's business model (including but not limited to that shown in FIG. 13B), would have to make all these adapters and accessory options at lower economies of scale and must also do many other tasks and experience headaches that Applicant has already overcome.

Thus, any third-party purchasers of board stacks can leverage the enclosure system(s) 100 herein to resecure/ reseal their products multiple times. The enclosure system(s) 100 can be broken down, and potentially re-assembled with IP67 preserved.

The system(s) 100 can be pushed into a seated position that doesn't require high-tech experience or finesse. The business model herein (FIG. 13B) achieves IP67-compli-ance as long as the lens cover connection \threading meets a predetermined torque threshold, which is set to be achiev-able by a hand seal, that is, hand seating. Thus, no special tools or implements are needed e.g. an impact wrench to fulfill this predetermined torque threshold.

This ends the discussion of the business model(s) con-templated herein.

Wrap-Up

A list of some key features is now provided. One is a modular back bezel 112 that would allow use of the enclo-sure with multiple standards, multiple IO standards, gigabit sensor and the potential for additional thermal dissipation by extending enclosure to dissipate the heat can collect due to contact resistance. A manufacturer or end-customer can disassemble and reassemble that back bezel 112 if needed, but stay IP-67 compliant in doing so, as long as that assembly reuses the O-rings 148 and applies the proper pressure to seat the various pieces (no torque/no screws) during re-assembly. Once the edge of the metal compresses the O-ring 148, the pieces slip quickly into a fully sealed position.

The enclosure system(s) 100 also offer modular case designs to the camera makers so they can swap out backend of the casing for e.g. a gigabit ethernet, a different backend for a USBC, yet another backend for coax. To accommodate such a need, the system(s) 100 will allow customers with modular electronics to change out the IP-rated back panel, and board stack assembly depending on their design, at their choice, at their own convenience and schedules with little or no change to the overall enclosure size (see FIG. 13B). Even after such a change-out, everything is still IP67 compliant.

For camera manufacturers, the embodiments herein reduce headaches not only for the enclosure body, but also eliminates a need for two backend pieces. Camera makers can thus isolate all of their I\O functionality on the back bezel 112, if they want. This adds to the various thermal and modularity advantages available within the system(s) 100 described herein.

Using the system(s) 100, it is possible to use a standard C-mount 170, and mount a lens directly thereto, and arrange for different lens covers, including different lengths. The embodiments herein can also have varying diameters on the through-tube(s) 108. By leveraging the above, the embodi-ments herein provide superior thermal dissipation from a processor within the board stack, which is the main source of heat.

Further, the embodiments herein are modular, in that a purchaser can swap out back bezel 112 for back-end connectivity (for Gig E, USB, Camera Link, Fiber, or integrated small format transceivers). The embodiments herein also implement usage of O-rings 148 instead of gaskets, and are thus more serviceable.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

B-Team Specification—Only Stubs, not Actual Claims

X. The method of Claim X, further comprising:
achieving IP67-compliance as long as the lens cover connection \threading meets a predetermined torque threshold achievable by hand seating not a torque wrench X. The method of Claim X, further comprising:
modular back bezel facilitating purchaser swapping out back bezel for back-end connectivity (for Gig E, USB, Camera Link, Fiber, or integrated small format transceivers).

X. The method of Claim X, further comprising:
the embodiments herein also implement usage of O-rings instead of gaskets X. The method of Claim X, further comprising:
incorporating a half-height arrangement of a heat sink;

X. The method of Claim X, further comprising:
arranging number of apertures within the heat sink to correspond with the number of connectors on the back bezel;

X. The method of Claim X, further comprising:
the front bezel and rear bezel made from 6061 T6 aluminum;

X. The method of Claim X, further comprising:
forming the heat sink and through tube separately, then fit them together later on two items can be of the same material, or can be of different material, and then fitted together later on.

X. The method of Claim X, further comprising:
the through tube being stainless, and the heat sink being aluminum.

X. The method of Claim X, further comprising:
incorporating spacers on the back so the overall enclosure system would sandwich together and hold its position. It's also possible to include springs to help items hold their position, and to ensure proper "make" of electrical grounding.

X. The method of Claim X, further comprising:
configuring the through-tube to be adaptable to work with various adapter pieces to accommodate a plethora of different diameters and geometries. One can put adapter pieces on the outside front. Make it a larger and put a large lens cover on it. One non-limiting way to achieve this is using step-ring adapters.

X. The method of Claim X, further comprising:
the through tube and the heat sink all in one piece using a turn mill. Bore out both sides with a lathe, use live tooling and cut out the inner aperture/window shapes using an end mill.

X. The method of Claim X, further comprising:
forming a single piece front bezel having both a lens mount and a lens cover mount;

What is claimed is:

1. A method of assembling and configuring an enclosure for a board stack, comprising:
configuring a through-tube to accommodate one or more heat sinks and one or more board stacks;
attaching a front bezel to a first end of the through-tube;
locating a board stack assembly camera inside the through-tube;
attaching a back bezel to a second end of the thru-tube; and
connecting the front bezel to the back bezel using one or more cylindrical fastening guides.

2. The method of claim 1, further comprising:
the front bezel further comprising a C-mount.

3. The method of claim 2, further comprising:
positioning a plurality of inner threads on the C-mount for mounting of a lens; and
positioning a plurality of outside threads on the C-mount for mounting of a lens cap.

4. The method of claim 2, further comprising:
the board stack comprising a heat dissipating portion; and
positioning the heat sink to be in contact with the heat dissipating portion.

5. The method of claim 4, further comprising:
the heat sink further comprising a heat transfer pad.

6. The method of claim 5, further comprising:
arranging/positioning the heat transfer pad to press up against the heat dissipating portion.

7. The method of claim 5, further comprising:
manufacturing the heat sink with an aluminum body.

8. The method of claim 6, further comprising:
the heat sink thermally conducting heat from the heat dissipating portion through the heat transfer pad.

9. The method of claim 8, further comprising:
arranging the heat transfer pad to all push against a single plane of the heat dissipating portion.

10. The method of claim 9, further comprising:
manufacturing the heat transfer pad from a spongy material so as to achieve as much contact as possible with the heat dissipating portion.

11. The method of claim 3, further comprising:
configuring the front bezel grounding pads in the form of bare metal surfaces; and
configuring the back bezel grounding pads in the form of bare metal surfaces.

12. The method of claim 3, further comprising:
substituting an S-mount for the C-mount where the S-mount has different size threads and different depths from the C-mount.

13. The method of claim 3, further comprising:

substituting an F-mount for the C-mount where the F-mount has different size threads and different depths from the C-mount.

14. The method of claim 3, further comprising:

locating three or more O-rings between the through-tube and the front bezel, back bezel, and within the outer threads of the C-mount;

positioning the O-ring within the outer threads to be suitable for sealing a lens cap and preserving IP67 compliance.

15. The method of claim 14, further comprising:

the O-rings on the lens mount suitable for preventing moisture ingress through a hole in the C-mount when no lens is attached.

16. The method of claim 14, further comprising:

locating one or more mount rings on the through tube thereby providing an ability to rotate attachments around a longitudinal axis of the through-tube.

17. The method of claim 16, further comprising:

positioning one or more ears on the one or more mount rings.

18. The method of claim 3, further comprising:

facilitating the enclosure system to be broken down and reassembled yet always preserving IP67 capability.

19. The method of claim 18, further comprising:

configuring the enclosure system to be adaptable to both IP-rated and non IP-rated applications.

20. The method of claim 3, further comprising:

configuring the enclosure system to be suitable for incorporating one of the following;

an IP-rated Gigabit Ethernet camera;

a USB camera;

a coax camera, or a CLHS camera.

\* \* \* \* \*